United States Patent [19]

Leitner et al.

[11] 3,947,502

[45] Mar. 30, 1976

[54] PRODUCTION OF FINELY DIVIDED ACICULAR MAGNETIC IRON OXIDES

[75] Inventors: Lutz Leitner, Rumeln-Kaldenhausen; Franz Hund, Krefeld-Bochum, both of Germany

[73] Assignee: Bayer Aktiengesellschaft, Leverkusen, Germany

[22] Filed: Jan. 11, 1973

[21] Appl. No.: 322,819

[30] Foreign Application Priority Data

Jan. 21, 1972 Germany............................ 2202853

[52] U.S. Cl. ............ 423/632; 252/62.59; 423/633; 423/634
[51] Int. Cl.² ....................................... C01G 49/02
[58] Field of Search.................. 423/632, 633, 634; 252/62.56, 62.59

[56] References Cited
UNITED STATES PATENTS 3,115,470   12/1963   Conley.............................. 252/62.5

FOREIGN PATENTS OR APPLICATIONS

| 395,610 | 1964 | Japan................................... 423/632 |
| 1,252,646 | 1967 | Germany ............................ 423/632 |
| 1,176,544 | 1964 | Germany .......................... 252/62.59 |

Primary Examiner—Oscar R. Vertiz
Assistant Examiner—Eugene T. Wheelock
Attorney, Agent, or Firm—Burgess, Dinklage & Sprung

[57] ABSTRACT

In the production of acicular, ferromagnetic iron oxide of high coercive force by oxidizing an iron (II)-hydroxide suspension with an oxygen-containing gas to form acicular iron (III) oxide hydroxide and dehydrating the iron (III) oxide hydroxide, optionally tempering, reducing and/or reoxidizing this into magnetic iron oxide, the improvement which comprises effecting the oxidation of the iron (II)-hydroxide suspension at a pH of at least about 13, the suspension including $SiO_2$ in the form of a sol or soluble salt, the resulting iron (III) oxide hydroxide having $SiO_2$ deposited thereon.

6 Claims, No Drawings

PRODUCTION OF FINELY DIVIDED ACICULAR MAGNETIC IRON OXIDES

This invention relates to a process for the production of finely divided, acicular iron oxides which have a high coercive force and are particularly suitable for use in magnetogram supports.

Acicular magnetic iron oxides which are as uniform as possible in size and have a length-to-width ratio of the needles of from 5:1 to 40:1, are currently used in the production of magnetogram supports. Acicular $\gamma$-$Fe_2O_3$ is predominantly used. Hitherto, the use of acicular $Fe_3O_4$ has frequently been unsuccessful because of its inadequate stability with respect to air, even after it has been incorporated into a binder.

Magnetic iron oxides are produced by dehydrating a non-magnetic acicular iron (III) oxide hydroxide, generally $\alpha$-FeO(OH), to form $\alpha$-$Fe_2O_3$, optionally tempering the $\alpha$-$Fe_2O_3$ thus formed, converting it with reducing gases into $Fe_3O_4$, and optionally re-oxidizing this to give $\gamma$-$Fe_2O_3$. The magnetic properties of magnetic iron oxides produced in this way are essentially determined by the shape and size of the magnetic particles. The shape and size of the magnetic iron oxide particles are largely determined by the geometry of the iron oxide hydroxide which is used for conversion into magnetic iron oxide. Accordingly, the length-to-width ratio of the needles, which governs the coercive force, must be adjusted in the iron oxide hydroxide itself. However, the method by which the $\alpha$-FeO(OH) is converted into magnetic iron oxide has a considerable influence in changing the needle geometry. If reduction is carried out at excessively high temperatures, the material sinters and agglomerates, the original shape of the needles being thus changed. This effect is reflected on the one hand in a decrease in the coercive force, and, on the other hand, by impaired magnetic and electro-acoustic properties, reflected for example in a decrease in the magnetic Br/Bs ratio (squareness-ratio) and in the signal-to-noise ratio, in tapes produced from sintered magnetic iron oxides. In principle, it is possible to carry out reduction at a relatively low temperature so that sintering of the material is prevented, although in such cases the reaction time must be increased to obtain complete reduction.

It is known from the Patent literature (cf Dutch Patent Application No. 64 06 512; German DAS No. 1,130,750; and U.S. Pat. No. 2,694,656) that dehydration of $\alpha$-FeO(OH) at temperatures of up to 816°C or tempering of the $\alpha$-$Fe_2O_3$ results in an improvement in the $\gamma$-$Fe_2O_3$ obtained therefrom. The undesired copying effect disappears. However, this is offset by a decrease in coercive force and by a deterioration in noise behavior that is undesirable for use in acoustic transmission.

Recently it has been proposed to improve stabilization of the acicular $\alpha$-FeO(OH) against sintering by coating the $\alpha$-FeO(OH) needles with chromium (III) oxide or by treating them with oxyacids of phosphorus or boron or with salts thereof. According to German DAS No. 1,252,646, acicular $\alpha$-FeO(OH) is stabilized by treatment with solutions of aluminum, titanium or zirconium salts or of an alkali silicate, the pH of the solutions being adjusted to be within the range in which hydrolysis begins. In the case of treatment with waterglass, a pH range of from 8.5 to 11.2 has been quoted for the beginning of hydrolysis. Also, the $\alpha$-FeO(OH) used is first separated off from the reaction solution in which it was produced. This involves an additional, complicated process stage and, in addition, the pH value of the suspension must be exactly maintained.

With reference to acicular iron (III) oxide hydroxide prepared by oxidation in a strongly alkali medium and which can be used as a particularly uniform starting material for preparing a magnetic iron oxide, there is particular interest in carrying out conversion into magnetic iron oxide at temperatures higher than those conventionally used (from 300° to 350° C) in order that a greater output of a magnetic pigment may be obtained, provided that this does not show excessive sintering of the needles and, at the same time, retains the high coercive orce and favorable Br/Bs-ratio.

Accordingly, it is an object of the present invention to stabilize acicular iron (III) oxide hydroxide produced in a strongly alkali medium by a simple method in such a way that sintering can be avoided, even when relatively high conversion temperatures are used, so that finely divided, acicular magnetic iron oxides of high coercive force and favorable Br/Bs-ratio can be prepared.

It has now been found that acicular, ferromagnetic iron oxides of high coercive force can be from produced acicular iron (III) oxide hydroxide by dehydrating, optionally tempering the $\alpha$-$Fe_2O_3$ formed, and reducing and/or reoxidizing this into magnetic iron oxide, provided that formation of the iron oxide hydroxide used as starting material is carried out by oxidizing an iron (II) hydroxide suspension containing $SiO_2$ in the form of a sol or soluble salt with an oxygen-containing gas in strongly alkaline medium present in stoichiometric excess, by a process in which $SiO_2$ is deposited during at least a part the oxidation of the iron (II) hydroxide into iron (III) oxide hydroxide.

During the oxidation of a suspension of iron (II) hydroxide into iron oxide hydroxide in a strongly alkaline medium at a pH of greater than about 13, $SiO_2$ is deposited in such a form that an $SiO_2$-containing iron (III) oxide hydrate is formed which does not sinter, even when exposed to high reduction temperatures, and which in addition shows considerably improved magnetic properties. The iron oxide hydroxide should preferably contain $SiO_2$ in a quantity of about 0.05 to 1.5% by weight. Compared with $SiO_2$-free $\alpha$-FeO(OH), $SiO_2$-containing $\alpha$-FeO(OH) thus prepared shows an extended range of conditions for conversion into $\alpha$-$Fe_2O_3$. Even with an $SiO_2$-content as low as about 0.3 to 0.4% by weight, based on dry $\alpha$-FeO(OH), it is possible to use temperatures of up to 800°C during dehydration or during a subsequent tempering operation without the needles being sintered. In addition, controlled tempering of the $\alpha$-$Fe_2O_3$ formed from the modified iron oxide hydroxide obtained in accordance with the invention leads to a further desirable improvement in the magnetic properties of $\gamma$-$Fe_2O_3$ or $Fe_3O_4$ pigments subsequently produced. Tempering of the $\alpha$-$Fe_2O_3$ is carried out over a period of about 0.5 to 3 hours, preferably about 0.5 to 1.5 hours at temperatures of about 400° to 800°C, preferably about 600° to 750°C. $\gamma$-$Fe_2O_3$ thus prepared has a coercive force of up to 481 Oersteds in the powder and, in addition to favorable Br/Bs-ratio, shows hardly any evidence of the so-called print through.

The iron (III) oxide hydrate is prepared in a strongly alkaline medium by methods known per se, for example in accordance with British patent specification No.

1,212,126, German DAS No. 1,204,644, German DOS No. 2,047,181 or German DOS No. 1,447,134. The processes use such large excesses of alkali that the pH is always above 13.

To carry out the process according to the invention, a solution of salts of silicic acid or a silica sol is added to the iron (II) hydroxide-iron oxide hydroxide suspension in a strongly alkaline medium. For example, sodium silicates, preferably in the form of waterglass, potassium silicates or guanidine silicate, can be used in the solutions of the salts of silicic acid. The silicate solutions or the silica sol should preferably have an $SiO_2$-content of about 0.5 to 5% by weight. Lower concentrations are uneconomical whereas excessively high concentrations often result in products which do not have a uniform $SiO_2$-content. The quantity of solution added is adapted to the $SiO_2$-content required in the finished oxide.

Provision must be made for homogeneous dispersion of the $SiO_2$-containing solution in the suspension by means of intensive stirring. At least about 50% of the iron (II) deposit should preferably be oxidized before the addition of, for example, waterglass solution, is commenced. It is of particular advantage to add the waterglass solution after 80% of the $Fe(OH)_2$ has been oxidized into $\alpha$-FeO(OH). The waterglass solution can be added all at once, although it is preferably gradually added dropwise until oxidation is complete. There is no need for the pH value to be checked because of the large excess of alkali.

One major advantage of the process according to the invention is that a process stage, namely filtration, is saved during preparation of the $SiO_2$-containing $\alpha$-FeO(OH). In the past, $\alpha$-FeO(OH) has normally been separated off from residual salts by filtration following its preparation, the filter cake brought back into a pulp-like form, and subsequent aftertreatment applied.

The improved magnetic iron oxides which may be obtained from Si-modified FeO(OH) according to the invention are eminently suitable for the production of magnetogram supports such as, for example, tapes, discs, strips for films or punched cards. Production of storage elements for recording magnetic impulses of any kind, such as acoustic signals, visible images or other types of information material, may be carried out by methods known per se.

Magnetogram supports containing highly coercive magnetic iron oxides which are free from foreign metals are desirable for a number of different reasons. For example, they are more suitable than low-coercivity and normal-coercivity products for transmitting short wave lengths. Thus, the influence of the demagnetizing effect can be suppressed using high-coercivity pigments with the result that it is possible to produce tapes having low bands constants. The transmission of high frequencies is better, the lower is the ratio of remanence to coercive force. Tapes with high coercive forces thus guarantee the limit of human hearing and hence natural reproduction of the sound-determining overtones. The sensitivity with which magnetic recording operations can be carried out is also improved by the high Br/Bs-ratios. Ferromagnetic materials of relatively high coercive force are also more suitable for video purposes by virtue inter alia of their greater recording density.

Production of the magnetic iron oxides in accordance with the invention is described in Examples 1 to 6 below, the production of magnetogram supports being additionally described in Examples 2 and 4.

EXAMPLE 1 a. Production of iron oxide hydroxide 8.2 Liters of an iron (II) sulfate solution containing 156 g of $FeSO_4$ per liter were introduced into a 25 liter capacity vessel and heating to 50°C while nitrogen was introduced at a rate of 200 liters per hour. At this temperature, iron (II) hydroxide was precipitated by the addition of 4 liters of an aqueous NaOH solution containing 385 g of NaOH per liter over a period of 6 minutes accompanied by vigorous stirring and the introduction of nitrogen. Thereafter, air was introduced initially at a rate of 350 liters per hour for 30 minutes with the vigorous stirring continued, and then at a rate of 1 $m^3$ per hour for 3.5 hours, at which time the oxidation was 89.0% complete. Then 300 ml of a dilute waterglass solution ($SiO_2$-content 3.3% by weight) were added to the suspension over a period of 50 minutes under the aforementioned reaction conditions with stirring and air introduction so that thorough admixture was guaranteed. This dilute waterglass solution contained 27.4 ml of a sodium waterglass solution ($\rho=1.37$ g $cm^{-3}$ with 26.3% by weight of $SiO_2$). Oxidation was continued during silicate addition for 1 hour. The suspension was filtered washed and dried. The $\alpha$-FeO(OH) contained 0.4% $SiO_2$.

b. Conversion into magnetic iron oxide

The acicular iron oxide hydroxide was converted into magnetic iron oxide by a known process in which the iron oxide hydroxide was dehydrated at 380°C, optionally followed by tempering, after which the $\alpha$-$Fe_2O_3$ so formed was reduced into acicular $Fe_3O_4$ at this temperature using hydrogen laden with water vapor. The product was then left to cool in nitrogen and oxidized into $\gamma$-$Fe_2O_3$ with air at 300°C.
Magnetic values on the powder:
Remanence: $Br/\rho = 463$ G cc $g^{-1}$
Coercive force: $I_{Hc} = 447$ Oe
Under the same preparation and conversion conditions, an acicular $\alpha$-FeO(OH) comparison product on which no $SiO_2$ was deposited gave a $\gamma$-$Fe_2O_3$ with the following magnetic data:
$Br/\rho = 458$ G cc $g^{-1}$
$I_{Hc} = 348$ Oe
Electron microscope photographs showed that this product had undergone greater sintering on the $\gamma$-$Fe_2O_3$ needles than the $SiO_2$-containing product. The coercive force was also distinctly lower than in the case of the treated product.

EXAMPLE 2

9.4 Liters of an $FeSO_4$ solution containing 2350 g of $FeSO_4.7H_2O$ were added at 50°C to 2.8 liters of a sodium hydroxide solution containing 1540 g of NaOH, accompanied by vigorous stirring and the introduction of air at a rate of 250 liters per hour. The iron (II) hydroxide precipitated over a period of 6 minutes. Thereafter, air was introduced at this temperature for a further 15 minutes at a rate of 250 liters per hour and thereafter at a rate of 1 $m^3$ per hour, the contents of the vessel being heated to 70°C at the same time. After 92.6% of the iron (II) content of the suspension had been oxidized, viz. 210 minutes, the same quantity of a dilute waterglass solution as described in Example 1 was added over a period of 3 minutes and oxidation continued with 1 m³ of air per hour until the suspension contained only α-FeO(OH). The α-FeO(OH) contained 0.38% of SiO₂.

The α-FeO(OH) thus prepared was dehydrated at 400°C, the α-Fe₂O₃ formed subsequently tempered at 700°C for 30 minutes and thereafter reduced at 400°C. Oxidation of the resulting Fe₃O₄ into the γ-Fe₂O₃ was carried out as described in Example 1. The following magnetic data were obtained on the powder:

$Br/\rho = 482$ G cc g$^{-1}$
$I_{Hc} = 456$ Oe

Following conversion under the same conditions, a product without any SiO₂ deposited onto it gave the following magnetic data:

Br $\rho = 472$ G cc g$^{-1}$
$I_{Hc} = 420$ Oe

Electron microscope photographs showed that the needles of the products without any SiO₂ were very heavily sintered whereas the original shape of the needles in the case of the treated preparations was still substantially intact even after tempering at elevated temperature. The γ-Fe₂O₃ was worked into a binder and a magnetic tape prepared by a known method. During drying of the lacquer on the tape, the acicular γ-Fe₂O₃ was oriented in a magnetic field. The product containing SiO₂ gave an Br/Bs-ratio on the tape of Br/Bs = 0.87
$I_{Hc} = 370$ Oe, whereas a similar product without any SiO₂ showed a decrease in Br/Bs-ratio due to the heavy sintering:

Br/Bs = 0.81
$I_{Hc} = 337$ Oe.

EXAMPLE 3

The α-FeO(OH) was prepared in accordance with Example 1. 1 hour before the end of the reaction (oxidation about 90% complete), 300 ml of a waterglass solution containing 220 ml of a sodium waterglass solution ($\rho = 1.37$ g cm$^{-3}$) were added to the Fe(OH)₂-/FeO(OH)-suspension over a period of 50 minutes with thorough admixing. After working up, the α-FeO(OH) had an SiO₂-content of 0.63%.

After tempering for 30 minutes at 750°C, followed by reduction at 440°C, conversion of the α-FeO(OH) thus prepared into γ-Fe₂O₃ gave the following magnetic data:

$Br/\rho = 470$ G cc g$^{-1}$
$I_{Hc} = 447$ Oe

After otherwise the same treatment, but with tempering for 30 minutes at 780°C, the γ-Fe₂O₃ formed had the following magnetic data:

$Br/\rho = 473$ G cc g$^{-1}$
$I_{Hc} = 452$ Oe

Both preparations showed good retention of their original needle shape despite the high tempering and reduction temperatures.

EXAMPLE 4

Following the procedure described in Example 2, 8.2 liters of an FeSO₄ solution containing 2350 g of FeSO₄.7 H₂O were added to 4 liters of an NaOH solution containing 1540 g of NaOH at 50°C, the precipitated iron (II) hydroxide oxidized into iron oxide hydroxide under the same conditions as described in Example 2 and SiO₂ deposited.

After tempering at 700°C for 30 minutes and reduction at 460°C, conversion of this material into γ-Fe₂O₃ produced a product with the following magnetic data:

$Br/\rho = 464$ G cc g$^{-1}$
$I_{Hc} = 481$ Oe.

After this γ-Fe₂O₃ had been worked into a magnetic tape, a coercive force $I_{Hc}$ of 395 Oe and a Br/Bs-ratio of 0.825 were obtained on the tape. The print through was 2 dB lower than in the case of a corresponding comparison samples without any SiO₂. Despite the high reduction temperature, the needles were well intact according to examinations with an electron microscope and did not show any signs of excessive sintering.

An α-FeO(OH) aftertreated by the process described in German DAS No. 1,252,646 was prepared with the same SiO₂-content and converted into γ-Fe₂O₃ under the same conditions as above. A product with the following magnetic data was obtained:

$Br/\rho = 408$ G cc g$^{-1}$
$I_{Hc} = 381$ Oe.

Electron microscope photographs showed that no uniform distribution of the SiO₂ on the needles occured in contrast to the product according to the invention. Furthermore, photographs showed that this comparison product had undergone greater sintering of the γ-Fe₂O₃. The coercive force was also distinctly lower than in the case of the inventive treated product.

EXAMPLE 5

The iron (II) hydroxide was oxidized into iron oxide hydroxide as described in Example 2. After 95% of the deposit iron (II) had been oxidized, 300 ml of a dilute waterglass solution containing 1.9 g of dissolved SiO₂ were added to the Fe(OH)₂/FeO(OH)-suspension over a period of 3 minutes. The pH of the suspension remained at 14 throughout.

The α-FeO(OH) thus prepared contained 0.21% of SiO₂. Following reduction at 380°C, conversion into γ-Fe₂O₃ gave a product with the following magnetic data on the powder:

$Br/\rho = 462$ G cc g$^{-1}$
$I_{Hc} = 448$ Oe

After a conversion involving tempering for 30 minutes at 750°C and subsequent reduction at 400°C, the following magnetic data were obtained:

$Br/\rho = 469$ G cc g$^{-1}$
$I_{Hc} = 463$ Oe.

EXAMPLE 6

The α-FeO(OH) was prepared as described in Example 5 but, instead of the 1.9 g of dissolved SiO₂, only 0.95 g of SiO₂ were added to the Fe(OH)₂/α-FeO(OH)-suspension in the manner described. The α-FeO(OH) contained 0.1% of SiO₂. Conversion into γ-Fe₂O₃ after reduction at 380°C gave a product with the following magnetic data on the powder:

$Br/\rho = 459$ G cc g$^{-1}$
$I_{Hc} = 423$ Oe.

It will be appreciated that the instant specification and examples are set forth by way of illustration and not limitation, and that various modifications and changes may be made without departing from the spirit and scope of the present invention.

What is claimed is:

1. In the production of acicular, ferromagnetic iron oxide of high coercive force by oxidizing an iron (II)-hydroxide suspension with an oxygen-containing gas to form acicular iron (III) oxide hydroxide and dehydrating the iron (III) oxide hydroxide, optionally tempering, reducing and re-oxidizing this into magnetic iron oxide, the improvement which comprises effecting the oxidation of the iron (II)-hydroxide suspension at a pH of at least 13, before the oxidation is more than 95% complete but after the oxidation is more than 50% complete $SiO_2$ being present in the suspension in the form of a sol or soluble salt, the resulting iron (III) oxide hydroxide having $SiO_2$ deposited thereon.

2. The process of claim 1 including the further step of tempering the dehydrated acicular iron (III) oxide at a temperature of about 400° to 800°C.

3. The process of claim 1 wherein the resulting iron (III) oxide hydroxide has about 0.05 to 1.5% by weight of $SiO_2$ deposited thereon.

4. The process of claim 3 wherein the $SiO_2$ is added to the suspension as a sol or as a solution of an alkali metal or guanidine silicate having an $SiO_2$ content of about 0.5 to 5% by weight.

5. The process of claim 1 including the further step of tempering the dehydrated acicular iron (III) oxide at a temperature of about 600° to 750°C.

6. The product produced by the process of claim 1.

* * * * *